US012106608B2

(12) United States Patent
Hong

(10) Patent No.: US 12,106,608 B2
(45) Date of Patent: Oct. 1, 2024

(54) APPARATUS AND METHOD FOR USER AUTHENTICATION BASED ON FACE RECOGNITION AND HANDWRITTEN SIGNATURE VERIFICATION

(71) Applicant: SECUVE Co., Ltd., Seoul (KR)

(72) Inventor: Ki-Yoong Hong, Seoul (KR)

(73) Assignee: SECUVE Co., Ltd., Seoul (KR)

( * ) Notice: Subject to any disclaimer, the term of this patent is extended or adjusted under 35 U.S.C. 154(b) by 403 days.

(21) Appl. No.: 16/758,795

(22) PCT Filed: Nov. 21, 2019

(86) PCT No.: PCT/KR2019/015989
§ 371 (c)(1),
(2) Date: Apr. 25, 2022

(87) PCT Pub. No.: WO2020/241987
PCT Pub. Date: Dec. 3, 2020

(65) Prior Publication Data
US 2022/0245969 A1 Aug. 4, 2022

(30) Foreign Application Priority Data

May 27, 2019 (KR) .......................... 10-2019-0061591

(51) Int. Cl.
*G06V 40/70* (2022.01)
*G06F 21/32* (2013.01)
(Continued)

(52) U.S. Cl.
CPC .............. *G06V 40/70* (2022.01); *G06F 21/32* (2013.01); *G06V 40/172* (2022.01); *G06V 40/394* (2022.01)

(58) Field of Classification Search
CPC .... G06V 40/70; G06V 40/172; G06V 40/394; G06F 21/32
See application file for complete search history.

(56) References Cited

U.S. PATENT DOCUMENTS

| 2004/0034784 | A1* | 2/2004 | Fedronic | G06Q 20/341 |
| | | | | 713/186 |
| 2016/0210453 | A1* | 7/2016 | Seo | G06F 3/04883 |
| 2020/0125706 | A1* | 4/2020 | Adir | H04L 9/3231 |

FOREIGN PATENT DOCUMENTS

| JP | 2010-182271 A | 8/2010 |
| KR | 10-1535591 B1 | 7/2015 |

(Continued)

*Primary Examiner* — Viet D Vu
(74) *Attorney, Agent, or Firm* — Studebaker & Brackett PC

(57) ABSTRACT

Provided are a method and an apparatus for user authentication based on face recognition and handwritten signature verification, by which authentication accuracy in user authentication using a handwritten signature is further increased. The method including: receiving a handwritten signature of a user; acquiring a face image of the user who inputs the handwritten signature, simultaneously with the receiving of the handwritten signature; determining whether the user is a legitimate user, on the basis of characteristics information of the face image; adjusting a reference value for verification based on characteristics information of the handwritten signature, according to a result of determination based on the characteristics information of the face image; determining whether the user is the legitimate user, on the basis of the characteristics information of the received handwritten signature and the adjusted reference value.

13 Claims, 7 Drawing Sheets

(51) Int. Cl.
*G06V 40/16* (2022.01)
*G06V 40/30* (2022.01)

(56) References Cited

FOREIGN PATENT DOCUMENTS

| KR | 10-2019-0014678 A | 2/2019 |
| KR | 10-2019-0019470 A | 2/2019 |
| KR | 101972800 B1 | 4/2019 |

\* cited by examiner

APPARATUS AND METHOD FOR USER AUTHENTICATION BASED ON FACE RECOGNITION AND HANDWRITTEN SIGNATURE VERIFICATION

CROSS-REFERENCE TO RELATED APPLICATIONS

This application is a National Stage of International Application No. PCT/KR2019/015989, filed Nov. 21, 2019, which claims benefit of priority to Korean Patent Application No. 10-2019-0061591 filed May 27, 2019, the entire content of which is incorporated herein by reference.

TECHNICAL FIELD

The present disclosure relates to a user authentication method for authenticating a user by distinguishing the user from others. In particular, the present disclosure relates to a method and an apparatus for user authentication based on face recognition and handwritten signature verification, wherein a false acceptance ratio and a false rejection ratio are minimized by adjusting a reference value that is a criterion for authenticating a handwritten signature using a face recognition technology, thereby increasing reliability of an authentication result.

BACKGROUND ART

As information and communications technology (ICT) has developed, various online services and contents have been provided and made life more enriched. However, because of this, the possibility of leakage of user's personal information has increased, so a user authentication technology has been important as a security technology for reducing the risk of leakage of a user's personal information.

The user authentication technology refers to a technology that identifies users individually and authenticates a registered user. Recently, beyond a conventional method using a password registered by a user, methods using user's unique biometric information, for example, fingerprints, retinas, irises, handwriting styles, etc., have been employed.

Among the methods, as a method using handwriting styles, which are different for each individual, there is a user authentication method using a signature. Herein, A signature can be a someone's name, assumed name, a proof that someone has made a record on a document, or a mark for identity, and is handwritten by a user. A signature is used for user identification in offline financial transactions, such as credit cards, etc., contracts for movable and immovable property, approval for various documents processed by companies, issuance of certificates at government offices, and the like.

The handwritten signature authentication technology is based on the characteristics of handwriting styles that are different according to user habits or behavior patterns. There are two methods: an image comparison method, which checks a match degree for a shape in a signature image, and a behavior characteristic comparison method, which compares characteristic data that occurs when a signer writes a signature.

In general, in the case of the handwritten signature authentication technology to which the image comparison method is applied, if even a third party imitates only the image shape of the handwritten signature, it may be determined that the handwritten signature is matched. Therefore, unfortunately, a false acceptance ratio of determining a handwritten signature stolen by an illegitimate person as a handwritten signature of a legitimate user is high.

In the handwritten signature authentication technology based on behavior characteristics, authentication is performed on the basis of behavior characteristics, such as pressure, speed, intersection points, angles at inflection points, etc., occurring due to signer's signature habits at the time of writing the handwritten signature, so that a prevention ration of false-acceptance may be increased by distinguishing a handwritten signature imitated by an illegitimate person. However, despite a user's own signature, the signature may vary according to a surrounding situation, an environment, and a user state, so it may be not recognized as the user's signature, which may increase a false rejection ratio.

DISCLOSURE

Technical Problem

The present disclosure is intended to increase authentication accuracy in user authentication using a handwritten signature, and is directed to providing a method and an apparatus for user authentication based on face recognition and handwritten signature verification, wherein a false acceptance ratio and a false rejection ratio are minimized by adjusting a reference value that is a criterion for authenticating a handwritten signature using a face recognition technology, thereby increasing reliability of an authentication result.

Technical Solution

According to the present disclosure, there is provided a method for user authentication based on face recognition and handwritten signature verification, the method including: receiving a handwritten signature of a user; acquiring a face image of the user who inputs the handwritten signature; determining whether the user is a legitimate user, on the basis of characteristics information of the acquired face image at a first analysis step; adjusting a reference value for verification based on characteristics information of the handwritten signature, according to a result of determination based on the characteristics information of the face image; and determining whether the user is the legitimate user, on the basis of the characteristics information of the received handwritten signature and the adjusted reference value at a second analysis step.

In the method, at the second analysis step, the characteristics information of the received handwritten signature may be compared with characteristics information of a pre-registered handwritten signature of the legitimate user and according to a degree of similarity therebetween, whether the user is the legitimate user may be determined.

In addition, in the method for user authentication according to the present disclosure, at the adjusting step, according to the result of determination based on the characteristics information of the face image, the reference value used at the second analysis step may be adjusted to reduce a false rejection ratio, or the reference value used at the second analysis step may be adjusted to reduce a false acceptance ration. Herein, the reference value may be adjusted within a preset range.

In addition, in the method for user authentication according to the present disclosure, at the first analysis step, the result of determination may be output as one or more among a numerical value, a probability, and a level. In this case, at the adjusting step, the reference value for verification based on the characteristics information of the handwritten signature may be adjusted differently according to one among the numerical value, the probability, and the level.

In addition, in the method for user authentication according to the present disclosure, at the first analysis step, the characteristics information of the acquired face image of the user may be compared with characteristics information of a pre-registered face image of the legitimate user and whether the user is the legitimate user may be determined according to a degree of similarity between the two face images. Alternatively, at the first analysis step, the characteristics information including one or more among gaze, a distance, a location, a direction, and behavior of the user may be extracted, and whether the user is the legitimate user may be determined on the basis of the characteristics information.

In addition, in the method for user authentication according to the present disclosure, at the acquiring of the face image of the user, while the user inputs the handwritten signature, the face image may be continuously acquired, and at the first analysis step, whether the user is the legitimate user may be determined repeatedly at predetermined intervals on the basis of the face image continuously acquired. Herein, at the adjusting step, the reference value for verification based on the characteristics information of the handwritten signature may be adjusted by combining one or more among results of determination output at the predetermined intervals at the first analysis step.

The method for user authentication based on face recognition and handwritten signature verification according to the present disclosure may be realized as a program, and the program may be recorded on a computer-readable recording medium.

In addition, according to the present disclosure, there is provided an apparatus for user authentication based on face recognition and handwritten signature verification, the apparatus including: an input unit receiving a handwritten signature from a user; a camera unit acquiring a face image of the user; and a control unit controlling the input unit and the camera unit, and processing data corresponding to the handwritten signature and the face image of the user that are transmitted from the input unit and the camera unit respectively, thereby authenticating the user, wherein the control unit is configured to: determine whether the user is a legitimate user, on the basis of characteristics information of the face image of the user transmitted from the camera unit, while the handwritten signature is input to the input unit; adjust a reference value for verification of the handwritten signature, according to a result of determination based on the characteristics information of the face image; and finally determine whether the user is the legitimate user, on the basis of the characteristics information of the handwritten signature of the user transmitted from the input unit and the adjusted reference value.

Advantageous Effects

According to the present disclosure, when a user writes a handwritten signature, a face image of the user who writes the signature is acquired to obtain characteristics information of the face image of the user as well as characteristics information of the handwritten signature of the user. On the basis of a result of face recognition based on the acquired face image, a reference value used in verification of the handwritten signature is adjusted. Depending on the adjusted reference value, the characteristics information of the handwritten signature is analyzed to determine whether the user who inputs the handwritten signature is a legitimate user. Consequently, the accuracy and reliability of user authentication based on a handwritten signature can be increased.

More specifically, according to the present disclosure, as a result of face recognition of a user who writes a handwritten signature, when it is determined that the user is a legitimate user or that the user actually writes the signature, on the basis of gaze, a location, a distance of the user, the number of times that the user blinks, etc., a reference value used in verification based on characteristics information of the handwritten signature is adjusted to reduce a false rejection ratio. Conversely, as the result of face recognition, when there is a suspicion that the user is not a legitimate user, the reference value is adjusted to reduce a false acceptance ratio. Through this, depending on a surrounding situation, an environment, and a user state at the time of writing a handwritten signature, the reference value used in verification of the handwritten signature is dynamically adjusted to minimize the false acceptance ratio and the false rejection ratio, and as a result, reliability of an authentication result can be increased.

BEST MODE

Figure 1:
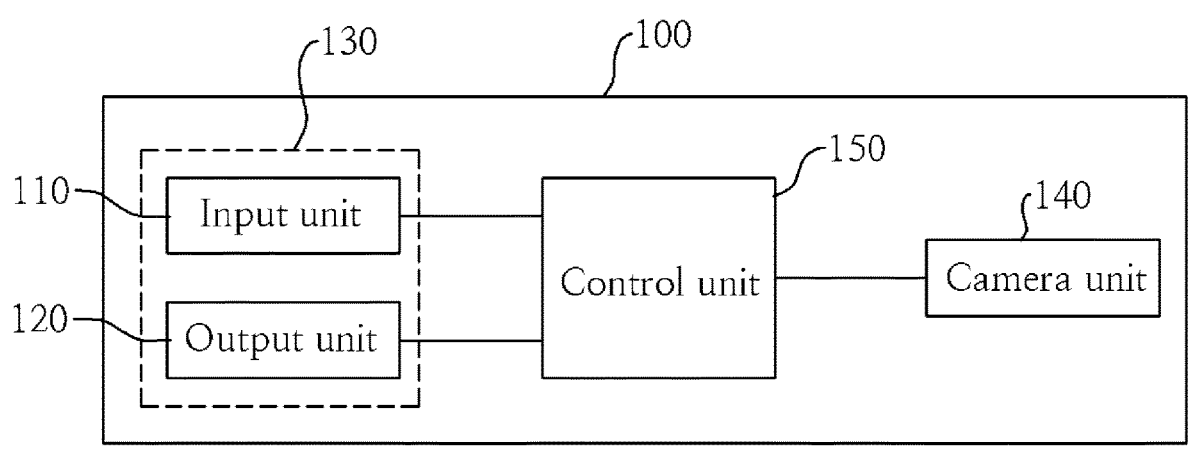
FIG. 1 is a block diagram illustrating a schematic configuration of an apparatus for user authentication based on face recognition and handwritten signature verification according to the present disclosure.

Hereinafter, exemplary embodiments of the present disclosure will be described in detail with reference to the accompanying drawings. However, the present disclosure is not limited thereto, and the exemplary embodiments of the present disclosure can be construed as including various modifications, equivalents, and/or alternatives. Regarding description of the drawings, similar elements are denoted by or similar reference numerals.

In particular, the terms and words used in the present specification and claims should not be interpreted as being limited to typical meanings or dictionary definitions, but should be interpreted as having meanings and concepts relevant to the technical scope of the present disclosure based on the rule according to which an inventor can appropriately define the concept of the term to describe most appropriately the best method he or she knows for carrying out the disclosure. Therefore, configurations described in exemplary embodiments and the accompanying drawings of the present disclosure do not represent all of the technical spirits of the present disclosure, but are merely preferable embodiments. Therefore, it should be understood that various equivalents and modifications thereof could be made at the time of filing this application.

In addition, the terms including ordinal numbers, first, second, etc., are used to describe various elements, are used only for distinguishing one element from other elements, and are not used to limit the elements. For example, a "second" element may be named a "first" element without departing from the scope of the present disclosure, and the "first" element may also be similarly named the "second" element.

In addition, it will be understood that when a first element is referred to as being "coupled to" or "connected to" a second element, the first element is logically or physically coupled or connected to the second element. In other words, the first element may be directly coupled or connected to the second element, an intervening element may be present, or the first element may be indirectly coupled or connected to the second element.

The terms used in the specification are merely used to describe particular embodiments, and are not intended to limit the present disclosure. As used herein, the singular forms "a", "an", and "the" are intended to include the plural forms as well, unless the context clearly indicates otherwise. In the specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

The present disclosure relates to a user authentication technology for identifying a user to check whether the user is a legitimate user. In particular, the present disclosure is based on a handwritten signature authentication technology, but further considers a face recognition technology so as to increase the performance of user authentication.

In the present disclosure, the user authentication technology based on a handwritten signature performs user authentication of a handwritten signature on the basis of characteristics information included in a handwritten signature, specifically, one or more of the following: image characteristics information of the handwritten signature; and signature behavior characteristics information, such as pressure, speed, intersection points, angles at inflection points, etc. occurring due to signer's signature habits.

In addition, in performing authentication on the basis of unique characteristics information extracted from a handwritten signature, the present disclosure may use a match degree analysis method and a deep learning analysis algorithm. In the match degree analysis method, characteristics information of a handwritten signature to be authenticated and characteristics information of a pre-registered handwritten signature are compared to grade a match degree and authentication success or failure is determined accordingly. The deep learning analysis algorithm is trained on the basis of training data (including a user's handwritten signature and imitated handwritten signatures that are forged, stolen, copied, or so on), wherein authentication failure and success results are known. In the case of the deep learning analysis algorithm, when characteristics information of a handwritten signature to be authenticated is input, a value of probability that the handwritten signature is a pre-registered handwritten signature is output as a result of analysis.

The present disclosure is not limited thereto, and various analysis algorithms published at the time of filing may be further used.

The present disclosure derives an authentication result to find out whether a user is a legitimate user through a handwritten signature, on the basis of such various algorithms. Herein, according to a result of face recognition based on characteristics information of a face image of the user acquired at the time of writing the handwritten signature, the present disclosure dynamically adjusts a reference value of a match degree/probability, etc. for determining the authentication success or failure, depending on a surrounding situation, an environment, and a user state at the time of inputting the handwritten signature, thereby increasing the accuracy and reliability of the authentication result.

FIG. 1 is a block diagram illustrating a schematic configuration of an apparatus for user authentication based on face recognition and handwritten signature verification according to the present disclosure.

The apparatus for user authentication according to the present disclosure may be implemented as a stand-alone type of independent device, or may be implemented as being provided in an existing device, such as a notebook PC, a tablet PC, a smartphone, a POS terminal, a kiosk, etc.

However, regardless of such various implementation forms, the apparatus for user authentication 100 according to the present disclosure, fundamentally as shown in FIG. 1, includes: an input unit 110 for receiving a handwritten signature; an output unit 120 for outputting an user interface (UI) for user authentication; a camera unit 140 for acquiring a face image of a user who inputs the handwritten signature; and a control unit 150 controlling the elements to perform user authentication based on face recognition and handwritten signature verification, and outputting an authentication result.

The input unit 110 is an element for receiving a handwritten signature to be authenticated according to the present disclosure. In general, a handwritten signature needs to be handwritten by the user, and for the input of such a handwritten signature, the input unit 110 may include one or more among a touchpad, a touch screen, and an electronic pen, as an input device capable of recognizing a handwritten signature when the user writes the handwritten signature with the finger or an electronic pen. Furthermore, in order to receive numbers or various types of letter information in addition to a handwritten signature, and to set various functions and control the functions of the apparatus, the input unit 110 may further include various types of input devices such as a keyboard, a keypad, a mouse, a motion sensor, etc.

The output unit 120 is an element for outputting messages or graphics to interface (user interface) in the apparatus for user authentication according to the present disclosure. Specifically, the output unit 120 may output an input handwritten signature, a message informing about a progression stage of authentication of a handwritten signature, an authentication result, a face image of a user, etc. The output unit 120 may be implemented as various display devices in the form of a flat-panel display, such as a liquid crystal display, an organic light-emitting diode (OLED) display, etc., or as a touch screen in which input and output are performed together.

That is, in the apparatus for user authentication 100 according to the present disclosure, the input unit 110 and the output unit 120 may be integrated like a touch screen device 130.

The camera unit 140 may be provided to face the space ahead of the input unit 110, in the apparatus for user authentication 100, so as to capture a face of a user who inputs a handwritten signature. According to control by the control unit 150, the camera unit 140 may continuously capture a face image of a user who writes a handwritten signature while the input of the handwritten signature through the input unit 110 is in progress.

The control unit 150 controls the overall operation of the apparatus for user authentication according to the present disclosure, and processes user authentication processing. The control unit 150 may include a memory storing a program therein, and one or more processors capable of processing program instructions for executing functions and processes according to a method for user authentication of the present disclosure. Herein, examples of the instructions executed by the processors may include script instructions, such as JavaScript or ECMAScript instructions, executable codes, or instructions stored in a computer-readable recording medium.

More specifically, the control unit 150 processes data corresponding to the handwritten signature and the face image of the user that are transmitted from the input unit 110 and the camera unit 140, and outputs a result of processing user authentication as authentication success or failure. In particular, in user authentication processing, the control unit 150 determines whether the user is a legitimate user, on the basis of characteristics information of the handwritten signature transmitted from the input unit 110.

In the present disclosure, in order to increase the accuracy and reliability of a result of verification of the handwritten signature, the control unit 150 receives the face image from the camera unit 140 while the handwritten signature is input to the input unit 110, extracts characteristics information of the face image, and determines whether the user is a legitimate user, on the basis of the extracted characteristics information of the face image. Before performing verification based on the characteristics information of the handwritten signature, a reference value of a match degree/probability, etc. for determining authentication success or failure based on the characteristics information of the handwritten signature is adjusted, according to a result of determination based on the characteristics information of the face image. In verification of the characteristics information of the handwritten signature input through the input unit 110, authentication success or authentication failure is determined on the basis of the reference value adjusted according to the result of face recognition.

That is, by using the result of face recognition of the user captured at the time of writing the handwritten signature, the reference value used in a handwritten signature verification is dynamically adjusted depending on the user state, the surrounding situation, and the environment at the time of writing the handwritten signature, and verification of the handwritten signature is performed using the adjusted reference value.

Figure 2:
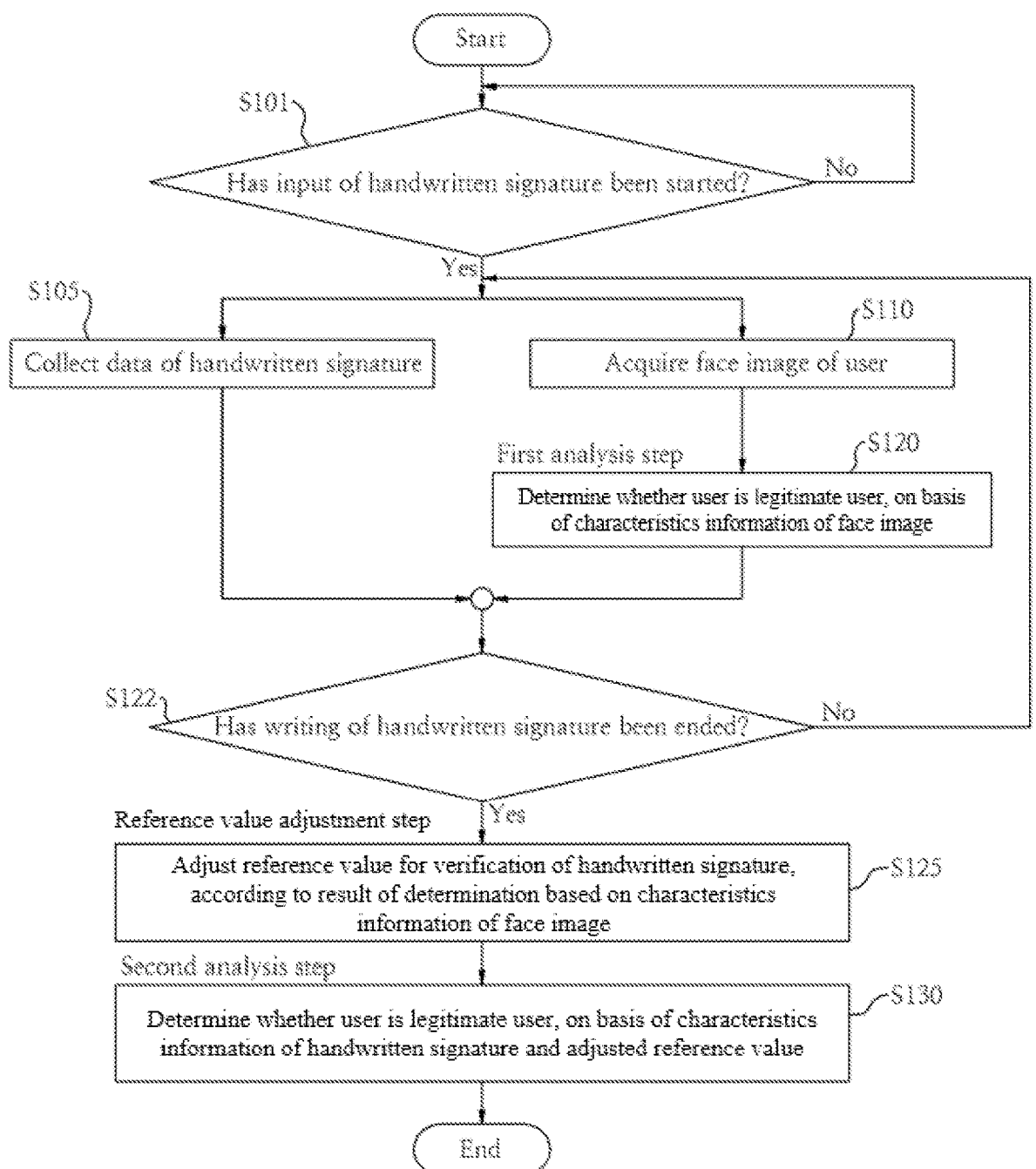
FIG. 2 is a flowchart illustrating a method for user authentication based on face recognition and handwritten signature verification according to the present disclosure.

FIG. 2 is a flowchart illustrating a method for user authentication based on face recognition and handwritten signature verification according to the present disclosure. Hereinafter, a process of user authentication in the apparatus for user authentication will be described in detail with reference to FIG. 2.

Referring to FIG. 2, when input of a handwritten signature starts at step S101, the apparatus for user authentication 100 according to the present disclosure collects data of the handwritten signature written by the user through the input unit 110 at step S105. Herein, the start of input of the handwritten signature may be recognized through a user's touch on the input unit 110, such as a touchpad or a touch screen, or may be recognized as a separate handwritten signature input button is selected. In addition, the collecting of the data of the handwritten signature is performed as follows. When the user inputs the handwritten signature for user authentication, the handwritten signature is recognized through the input unit 110 and sensed information, such as the shape of the handwritten signature written by the user, touch positions in writing the handwritten signature, speed, pressure, etc., is collected.

Furthermore, while the input of the handwritten signature starts at step S101 and the data of the handwritten signature is collected, the apparatus for user authentication 100 according to the present disclosure activates the camera unit 140 through the control unit 150 to acquire a face image of the user who writes the handwritten signature at step S110, and determines whether the user is a legitimate user, on the basis of characteristics information of the acquired face image at step S120. The acquiring of the face image of the user and the determining of whether the user is a legitimate user, based on the characteristics information of the acquired face image may be performed continuously or repeatedly at steps S110, S120, and S122 while the input of the handwritten signature is in progress at step S105.

When the input of the handwritten signature ends at step S122, the control unit 150 of the apparatus for user authentication adjusts a reference value used in verification of the handwritten signature, at step S125 according to a result of determination based on the characteristics information of the face image performed at step S120. Herein, the adjusted reference value is a value that serves as a criterion for determining a match degree between the characteristics information of the input handwritten signature and characteristics information of a registered handwritten signature.

That is, the control unit 150 of the apparatus for user authentication 100 determines, on the basis of the characteristics information of the input handwritten signature and the adjusted reference value, whether the user is a legitimate user at step S130.

Herein, for convenience, step S120 may be regarded as a first analysis step and step S130 may be regarded as a second analysis step. The first analysis step S120 and the second analysis step S130 may be performed almost simultaneously.

For reference, the first analysis step S120 may be performed using a face recognition algorithm, and the second analysis step S130 may be performed using a handwritten signature analysis program such as a deep learning analysis algorithm or a match-degree analysis algorithm. Herein, the face recognition algorithm and the handwritten signature analysis algorithm operate independently to each other. As the results of determination at the first analysis step S120 and the second analysis step S130, whether the user is a legitimate user may be represented or may be expressed as one or more among a numerical value, a probability, and a level. For example, a degree to which the face image and the handwritten signature match a face image and a handwritten signature of a registered legitimate user may be calculated as a numerical value, level or a probability and may be output.

A detailed analysis method at the first and the second analysis step S120 and S130 will be described as follows.

At the first analysis step S120, the acquired face image of the user is compared with a pre-registered face image of a legitimate user, and depending on a degree of similarity between the acquired face image and the pre-registered face image, it may be determined whether the user is a legitimate user. Alternatively, from the face image of the user, the characteristics information including one or more among gaze, a distance, a location, a direction, and behavior of the user is further extracted, and on the basis of the characteristics information, it may be determined whether the user is a legitimate user.

For reference, according to gaze, a distance, a location, a direction, or behavior of the user, it may be determined whether the recognized face is the face of the user who writes the handwritten signature, for example, whether the recognized face is a real person's face or a face in a photograph or a doll's face.

That is, at the first analysis step S120, according to the match degree for a legitimate user actually registered, it is determined whether the user is the legitimate user. Alternatively, it is determined whether the acquired face image is a photograph or doll or an image of a real person, or it is identified whether the user is a person who actually writes a signature. When it is recognized that the user whose face is recognized actually writes a signature, it is determined that the user is the legitimate user. In addition, at the first analysis step S120, the two methods described above may be used in combination. This enables distinguishing between a case in which an illegitimate user uses a photograph of a legitimate user and a case in which a legitimate user actually writes a signature.

At the second analysis step S130, the input handwritten signature and a pre-registered handwritten signature of a legitimate user are compared and according to the degree of similarity, it is determined whether the user is the legitimate user.

In addition, when the input of the handwritten signature ends, the control unit 150 of the apparatus for user authentication 100 according to the present disclosure adjusts a reference value for verification based on the characteristics information of the handwritten signature at step S125 according to the result, which is derived at the first analysis step S120, of determination based on the characteristics information of the face image. The adjustment at step S125 may be performed as follows. According to the result of determination based on the characteristics information of the face image, the reference value used at the second analysis step is adjusted to reduce a false rejection ratio. Alternatively, according to the result of determination based on the characteristics information of the face image, the reference value used at the second analysis step is adjusted to reduce a false acceptance ratio.

More specifically, at the adjusting step S125, the false rejection ratio may be reduced by lowering the reference value for determining a legitimate user in authentication of the handwritten signature. Conversely, the false acceptance ratio may be reduced by raising the reference value for determining a legitimate user.

According to this, in a situation where there is a suspicion that an illegitimate person forges and uses the handwritten signature of the legitimate user, even a skillfully forged handwritten signature is distinguished by minimizing the false acceptance ratio. In a case where the user is highly likely to write a signature according to the result of face recognition, adjustment is performed to minimize the false rejection ratio, thereby preventing false rejection even when the handwritten signature is slightly different depending on the user's surrounding situation or state.

Figure 3:
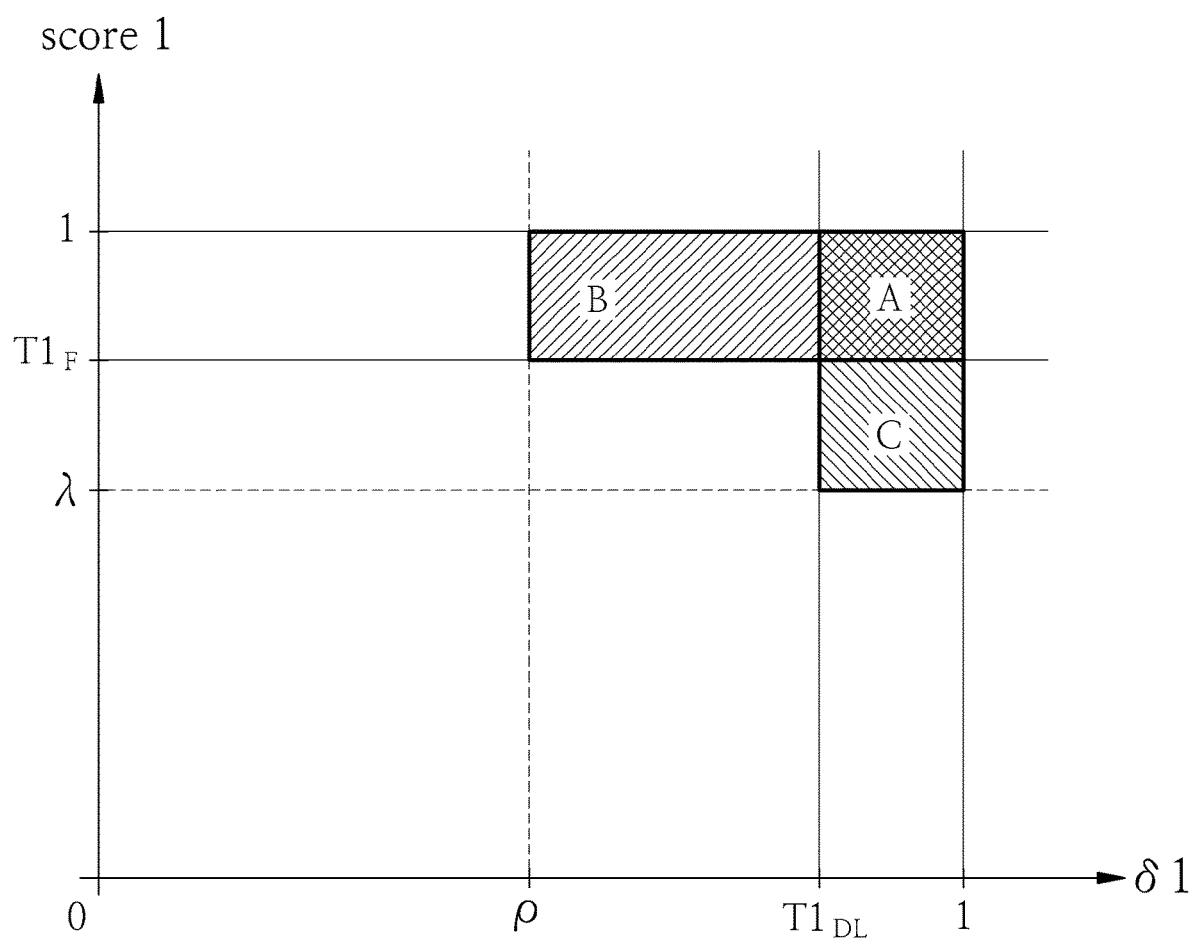
FIG. 3 is a diagram illustrating a process of adjusting a result of authenticating a handwritten signature, in user authentication based on face recognition and handwritten signature verification according to the present disclosure.

For example, as shown in FIG. 3, it is assumed that in the second analysis step S130, the apparatus for user authentication 100 according to the present disclosure determines whether the input handwritten signature is a handwritten signature of a legitimate user, by using the match-degree analysis algorithm, the deep learning analysis algorithm based on training, and four threshold values $\rho$, $T1_{DL}$, $T1_F$, and $\lambda$. Herein, the match-degree analysis algorithm compares the characteristics information of the input handwritten signature and the characteristics information of the pre-registered handwritten signature so as to grade a match degree, and performs determination. Herein, the first threshold value $\rho$ is a reference value for determining authentication success in the deep learning analysis algorithm. The second threshold value $T1_{DL}$ is a reference value that is set among values greater than the first threshold value $\rho$ and lower than 1. The third threshold value $T1_F$ is a reference value for determining authentication success in the match-degree analysis algorithm. The fourth threshold value $\lambda$ is a reference value that is set among values greater than 0 and lower than the third threshold value $T1_F$.

Herein, the control unit 150 of the apparatus for user authentication 100 according to the present disclosure extracts characteristics information from the input handwritten signature, and applies the characteristics information to the match-degree analysis algorithm and the deep learning analysis algorithm each. Then, the control unit 150 calculates a score (score1) representing the match degree numerically, which is a result of comparing the input handwritten signature with the pre-registered handwritten signature through the match-degree analysis algorithm, and calculates a value $\delta 1$ of probability that the input handwritten signature is a handwritten signature of a legitimate user through the deep learning analysis algorithm. In the cases corresponding to areas A, B, and C in which when the value $\delta 1$ of probability is equal to or greater than the first threshold value $\rho$ and the score (score1) is equal to or greater than the third threshold value $T1_F$, or when the value $\delta 1$ of probability is equal to or greater than the second threshold value $T1_{DL}$ and the score (score1) is equal to or greater than the fourth threshold value $\lambda$, authentication success is determined for the corresponding handwritten signature. The other cases that do not fall under areas A, B, and C are determined as authentication failure as illegitimate handwritten signatures. This is a method for increasing accuracy and reliability of a handwritten signature by combining analysis results of the two algorithms to determine whether authentication is successful.

However, in the case of this method, if areas A, B, and C are set too small, the false rejection ratio may increase. Conversely, if areas A, B, and C are set too large, the false acceptance ratio may increase. Accordingly, the reliability of an authentication result may be reduced in any of the above cases. Therefore, it is necessary to appropriately set the four threshold values.

In the present disclosure, assuming that the second analysis step S130 is performed as described above, when it is determined that the user writing a handwritten signature is a legitimate user as a result of analysis for face recognition at the first analysis step S120, the handwritten signature is highly likely to be a handwritten signature actually written by the user. Therefore, one or more among the first to the fourth threshold value are adjusted to increase the size of areas A, B, and C, and then it is determined whether authentication of the handwritten signature is successful. Consequently, the false rejection ratio is reduced. It is preferable that one or more among the second threshold value $T1_{DL}$, the third threshold value $T1_F$, and the fourth threshold value $\lambda$ are adjusted downward.

Conversely, at the first analysis step S120, as a result of analysis of face recognition, when there is a suspicion that the user writing a handwritten signature is not a legitimate user, one or more among the first to the fourth threshold value are adjusted to decrease the size of areas A, B, and C, and then it is determined whether authentication of the handwritten signature is successful. Consequently, the false acceptance ratio is reduced. It is preferable that one or more among the second threshold value $T1_{DL}$, the third threshold value $T1_F$, and the fourth threshold value λ are adjusted upward.

In addition, at the step S125 of adjusting the reference value for verification of the handwritten signature, when the reference value for verification based on the characteristics information of the handwritten signature is adjusted, it is preferable that the reference value is adjusted within a preset (predetermined) range. For example, as shown in FIG. 3, when authentication success or failure of the handwritten signature is determined on the basis of the first to the fourth threshold value, it is preferable that the second threshold value $T1_{DL}$ is adjusted within a range between the first threshold value ρ and the maximum value (1), the third threshold value $T1_F$ is adjusted within a range between the fourth threshold value λ and the maximum value (1), and the fourth threshold value λ is adjusted within a range between the minimum value (0) and the third threshold value $T1_F$.

In addition, when the result of determination at the first analysis step S120 can be output as a numerical value or level for the match degree/value of probability, etc., the degree to which the reference value used at the second analysis step S130 is adjusted at the adjusting step S125 varies according to one among the numerical value, probability, and level calculated at the first analysis step S120, whereby optimal adjustment is performed on a result of authenticating a handwritten signature. That is, as the result of analysis at the first analysis step S120, the greater the likelihood of a legitimate user, the greater the degree of reduction of the reference value. Alternatively, the greater the likelihood of an illegitimate user, the greater the degree of increase of the reference value. Accordingly, in the method for user authentication according to the present disclosure, the false rejection ratio and the false acceptance ratio are dynamically managed.

In addition, at the step S110 of acquiring the face image of the user, while the user inputs the handwritten signature at step S105, when the face image is continuously acquired at steps S110 and S122, it is repeatedly determined at predetermined intervals whether the user is a legitimate user at the first analysis step S120, on the basis of the face image continuously acquired. Afterward, at the adjusting step S125, by combining one or more of results of determination output at predetermined intervals at the first analysis step S120, the reference value for verification based on the characteristics information of the handwritten signature is adjusted.

For example, the reference value for verification based on the characteristics information of the handwritten signature may be adjusted using the most negative result among the results of analysis of face recognition determined repeatedly at predetermined intervals. Alternatively, the reference value for verification based on the characteristics information of the handwritten signature may be adjusted using an average value of the results of analysis of face recognition determined repeatedly at predetermined intervals.

As described above, in the method and the apparatus for user authentication according to the present disclosure, when a handwritten signature is written, a face image of a user is acquired simultaneously, and on the basis of a result of face recognition based on the acquired face image, a reference value for verification based on characteristics information of the handwritten signature is adjusted. By combining a face recognition technology and a handwritten signature verification technology, the accuracy and reliability of user authentication based on a handwritten signature may be further increased.

The apparatus for user authentication according to the present disclosure described above may be realized as a stand-alone type of independent device, or may be realized as being provided in an existing device, such as a notebook PC, a tablet PC, a smartphone, a POS terminal, a kiosk, etc., as described above.

FIGS. 4 to 7 are diagrams illustrating various examples of an apparatus for user authentication based on face recognition and handwritten signature verification according to the present disclosure.

Figure 4:
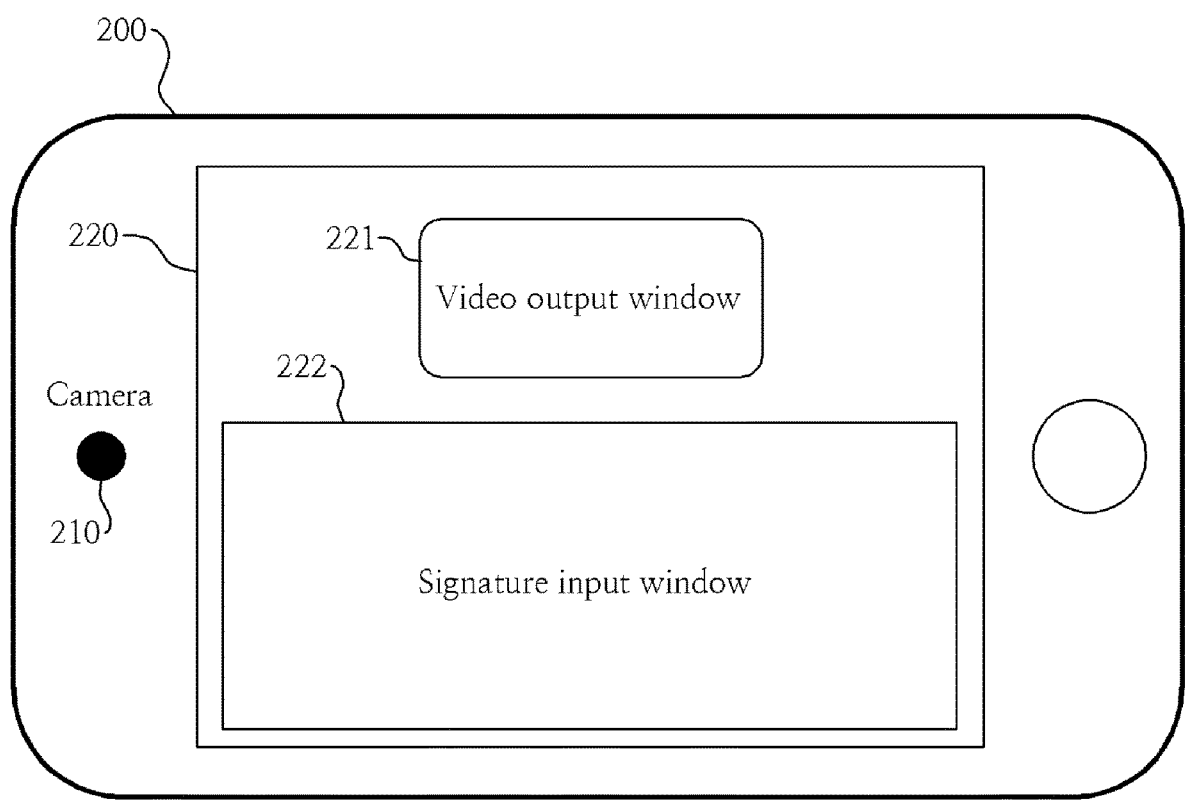
FIGS. 4 to 7 are diagrams illustrating various examples of an apparatus for user authentication based on face recognition and handwritten signature verification according to the present disclosure.
Figure 5:
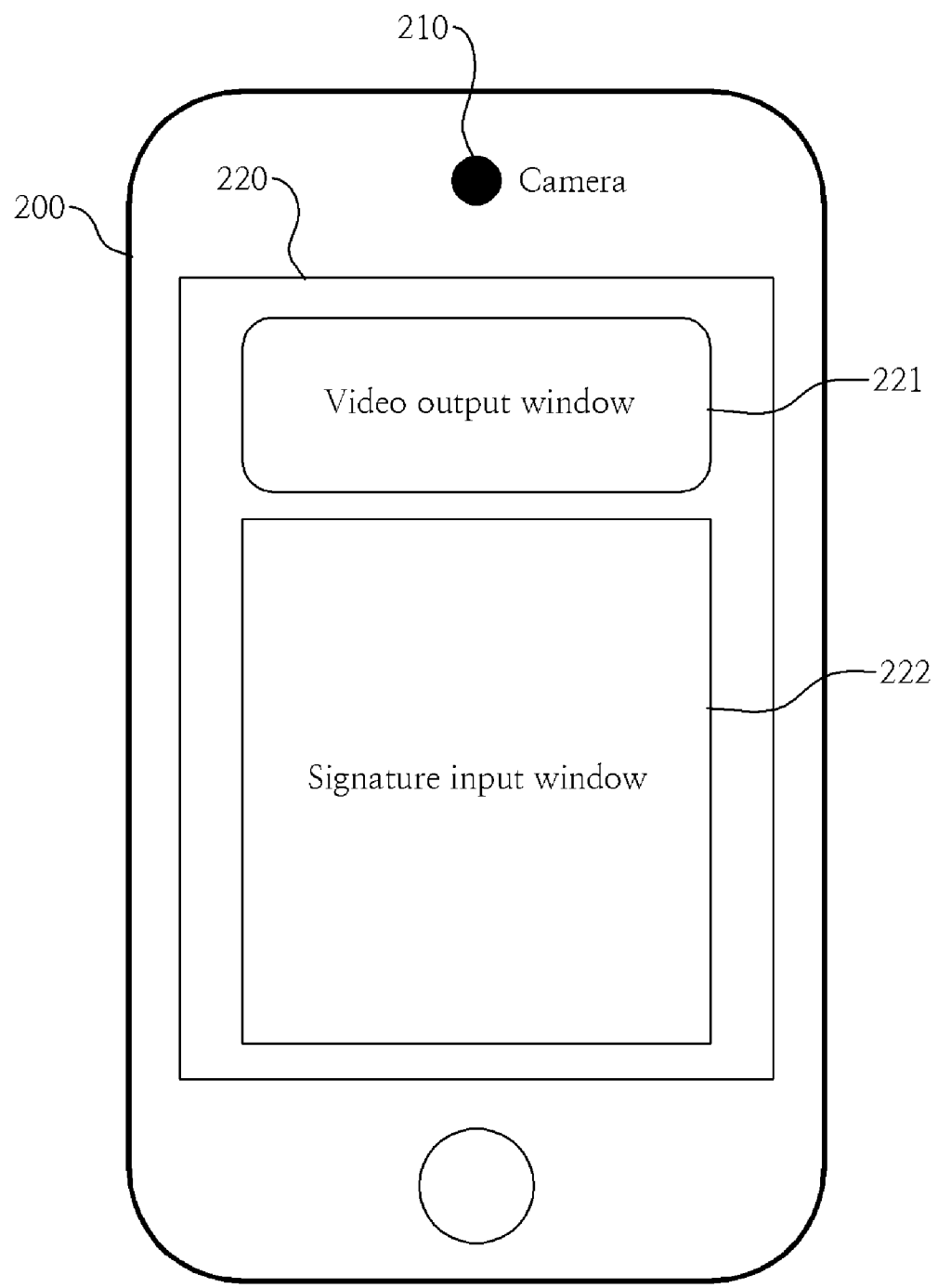

First, FIGS. 4 and 5 show an example in which the apparatus for user authentication according to the present disclosure is realized as a portable terminal apparatus, such as a smartphone, a PDA, a tablet PC, etc. As shown in the figures, regarding the apparatus for user authentication 200 realized as the portable terminal apparatus, a camera unit 210 and a touch screen 220 in which input and output are performed together are provided at the front of the apparatus, and an UI screen for user authentication processing is output on the touch screen 220. In the UI screen, a video output window 221 for outputting a video of a user's face photographed by the camera unit 210, and a signature input window 222 are realized. The signature input window 222 is an area to which a user inputs a handwritten signature through touch input and in which input and output of a handwritten signature may be performed simultaneously.

In the case of being realized as the portable terminal apparatus, depending on the screen size of the apparatus, as shown in FIG. 4, arrangements, sizes, and ratios of the camera unit 210, the video output window 221, and the signature input window 222 may vary as shown in FIG. 4 or 5, or into other arrangements, sizes, and ratios.

Figure 6:
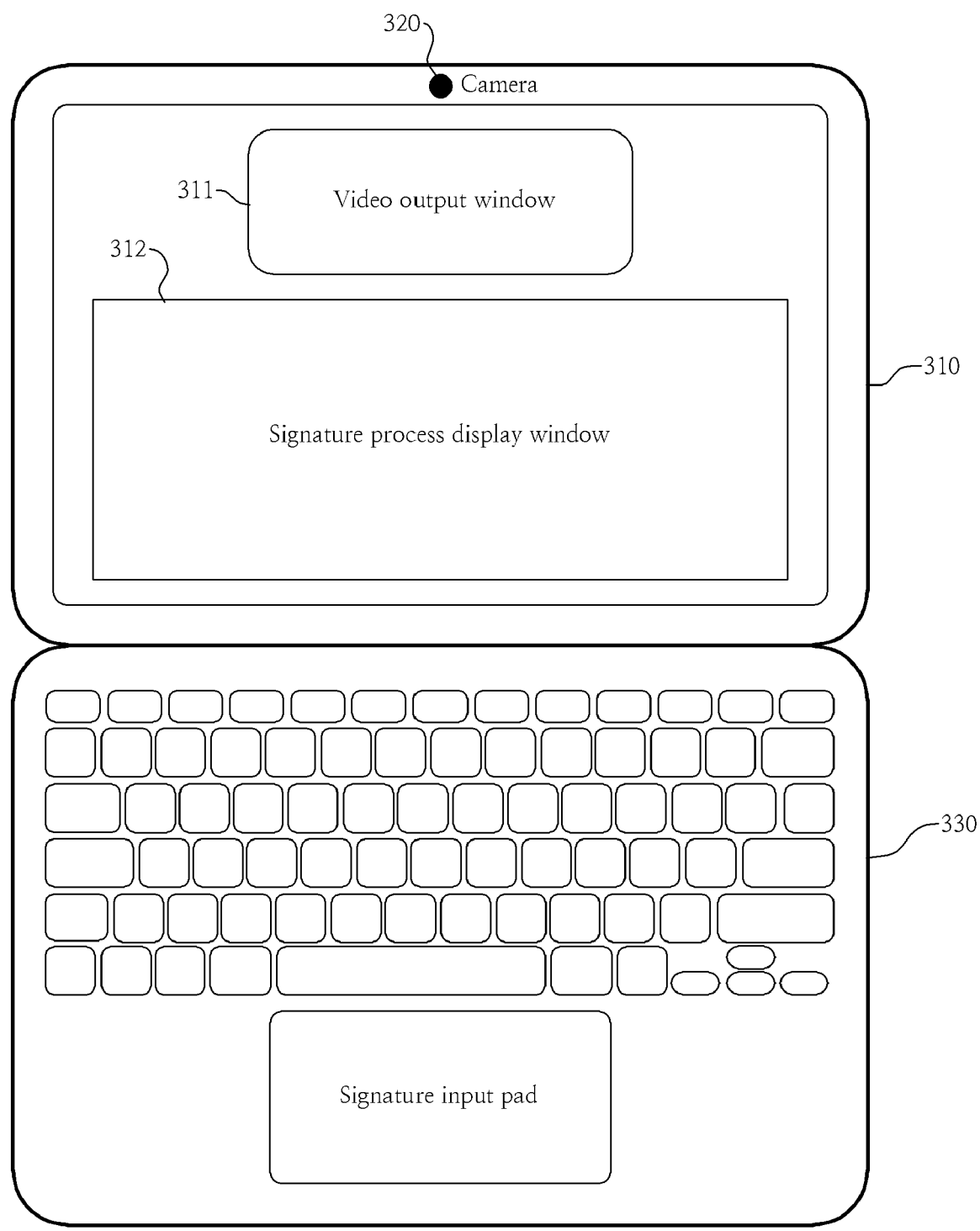

The apparatus for user authentication according to the present disclosure may be realized in a notebook PC. The notebook PC, as shown in FIG. 6, includes a display unit 310 and a body unit 330. A touchpad is generally provided at the front of the body unit 330, and a camera 320 is provided at the top portion of the display unit 310.

In the case of using such a notebook PC, in the apparatus for user authentication according to the present disclosure, a touchpad (signature input pad) may substitute for the input unit for input of a signature. On the screen of the display unit 310, a video output window 311 for outputting a video of a face photographed by a camera 320 and a signature process display window 312 for displaying the signature input via the touchpad are provided together, similarly.

Therefore, a user is able to write a signature on the touchpad (signature input pad) of the body unit 330 while viewing the video output window 311 and the signature process display window 312 of the display unit 310.

In addition, the apparatus for user authentication according to the present disclosure may be realized as a desktop PC or a fixed apparatus, such as a kiosk, and a POS terminal.

Figure 7:
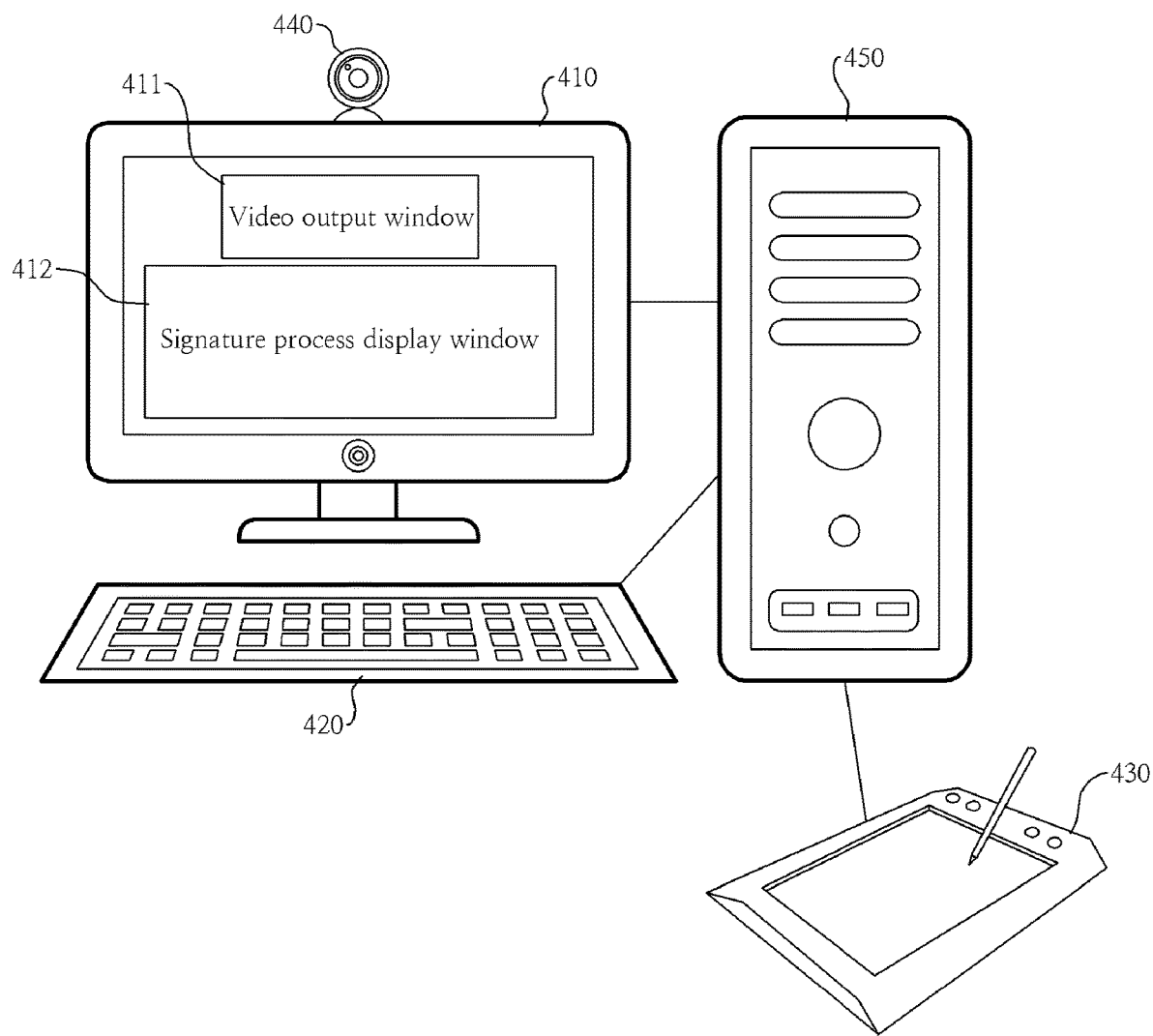

Referring to FIG. 7, the desktop PC or the fixed apparatus, such as a kiosk, and a POS terminal, includes a display device 410, a keyboard device 420, and a body 450. Herein, the camera 440 may be provided at the top portion of the display device 410 or may be connected externally. In the case of being realized as such a fixed apparatus, a signature input pad 430 for input of a handwritten signature of a user makes a touchpad connected externally, and provides an UI including a video output window 411 and a signature process display window 412 to the display device 410, thereby realizing the apparatus for user authentication.

Accordingly, a user is able to input a handwritten signature of the user through the signature input pad 430, check the input handwritten signature through the signature process display window 412 on the display device 410, and check a video of the user's face through the video output window 411.

According to the above-described various types of apparatuses for user authentication, at the time of writing a handwritten signature, a user inputs the handwritten signature while adjusting the location of the user through the video output windows 221, 311, and 411 so as to view a video of the user's face. Accordingly, the handwritten signature and a face image of the user are acquired together and a result of face recognition is further considered, thereby increasing the accuracy and reliability of authentication using characteristics information of the handwritten signature.

INDUSTRIAL APPLICABILITY

The present disclosure is a user authentication technology that is applicable both online and offline. When a handwritten signature is written, a face image of a user is acquired simultaneously, and on the basis of a result of face recognition based on the acquired face image, a reference value for verification based on characteristics information of the handwritten signature is adjusted, thereby further increasing the accuracy and reliability of user authentication based on a handwritten signature. The present disclosure has high industrial applicability.

More specifically, according to the present disclosure, as a result of face recognition of a user who writes a handwritten signature, when it is determined that the user is a legitimate user or that a signature of a legitimate user is written, on the basis of gaze, a location, a distance of the user, the number of times that the user blinks, etc., a reference value that is a criterion for user authentication based on characteristics information of the handwritten signature is set such that a false rejection ratio is reduced. Conversely, as the result of face recognition, when there is a suspicion that the user is not a legitimate user, the reference value is adjusted such that a false acceptance ratio is reduced. Consequently, the false acceptance ratio and the false rejection ratio are minimized and reliability of an authentication result is increased.

The invention claimed is:

1. A method for user authentication based on face recognition and handwritten signature verification, the method comprising:
   receiving a handwritten signature of a user;
   acquiring a face image of the user who inputs the handwritten signature;
   performing a first analysis step of determining whether the user is a legitimate user, on the basis of characteristics information of the face image;
   adjusting a reference value for handwritten signature verification, according to a result of the first analysis step; and
   performing a second analysis step of determining whether the user is the legitimate user, on the basis of characteristics information of the received handwritten signature and the adjusted reference value.

2. The method of claim 1, wherein at the first analysis step, the acquired face image of the user is compared with a pre-registered face image of the legitimate user and whether the user is the legitimate user is determined according to a degree of similarity between the acquired face image and the pre-registered face image.

3. The method of claim 1, wherein at the first analysis step, the characteristics information including one or more among gaze, a distance, a location, a direction, and behavior of the user is further extracted from the face image of the user, and whether the user is the legitimate user is determined on the basis of the characteristics information.

4. The method of claim 1, wherein at the first analysis step, the result of determination is output as one or more among a numerical value, a probability, and a level, and at the adjusting step, the reference value for verification based on the characteristics information of the handwritten signature is adjusted differently according to one among the numerical value, the probability, and the level.

5. The method of claim 2, wherein the adjusting comprises:
   when the likelihood of a legitimate user is determined as great based on the degree of similarity between the acquired face image and the pre-registered face image, adjusting the reference value for handwritten signature verification to reduce a false rejection ratio of the received handwritten signature.

6. The method of claim 2, wherein the adjusting comprises:
   when the likelihood of an illegitimate user is determined as great based on the degree of similarity between the acquired face image and the pre-registered face image, adjusting the reference value for handwritten signature verification to reduce a false acceptance ratio of the received handwritten signature.

7. The method of claim 2, wherein the adjusting comprises:
   adjusting the reference value for handwritten signature verification within a preset range, depending on the degree of similarity between the acquired face image and the pre-registered face image.

8. The method of claim 1, wherein at the second analysis step, the input handwritten signature is compared with a pre-registered handwritten signature of the legitimate user and according to a degree of similarity therebetween, whether the user is the legitimate user is determined.

9. The method of claim 1, wherein at the acquiring of the face image of the user, while the user inputs the handwritten signature, the face image is continuously acquired, and at the first analysis step, whether the user is the legitimate user is determined repeatedly at predetermined intervals on the basis of the face image continuously acquired.

10. The method of claim 9, wherein the adjusting comprises:
    combining one or more among results of determination output at the predetermined intervals at the first analysis step; and
    adjusting the reference value for handwritten signature verification, according to the combined results.

11. A computer-readable recording medium having a program recorded thereon, the program for executing the method for user authentication based on face recognition and handwritten signature verification according to claim 1.

12. A program recorded on a computer-readable recording medium, the program being configured to execute the method for user authentication based on face recognition and handwritten signature verification according to claim 1.

13. An apparatus for user authentication based on face recognition and handwritten signature verification, the apparatus comprising:
    an input unit receiving a handwritten signature from a user;
    a camera unit acquiring a face image of the user; and
    a control unit controlling the input unit and the camera unit, and processing data corresponding to the handwritten signature and the face image of the user that are transmitted from the input unit and the camera unit respectively, thereby authenticating the user, wherein the control unit is configured to:

perform a first analysis step of determining whether the user is a legitimate user, on the basis of characteristics information of the face image of the user transmitted from the camera unit, while the handwritten signature is input to the input unit;

adjust a reference value for handwritten signature verification, according to a result of the first analysis step; and perform a second analysis step of determining whether the user is the legitimate user, on the basis of the characteristics information of the handwritten signature transmitted from the input unit and the adjusted reference value.

\* \* \* \* \*